United States Patent
Gano

[11] 3,991,784
[45] Nov. 16, 1976

[54] HIGH/LOW SAFETY VALVE

[75] Inventor: John C. Gano, Dallas, Tex.

[73] Assignee: Otis Engineering Corporation, Dallas, Tex.

[22] Filed: May 5, 1975

[21] Appl. No.: 574,579

[52] U.S. Cl. .............................. 137/458; 137/467; 137/488; 251/86
[51] Int. Cl.² ................. F16K 17/00; F16K 25/00
[58] Field of Search ......... 137/458, 485, 488, 489, 137/489.5, 460, 467; 251/86, 84, 124

[56] References Cited
UNITED STATES PATENTS

| | | | |
|---|---|---|---|
| 1,832,341 | 11/1931 | Williamson | 251/86 |
| 2,629,578 | 2/1953 | Paul | 137/460 |
| 2,718,371 | 9/1955 | Erdman | 285/84 |
| 2,923,316 | 2/1960 | Paul et al. | 137/489.3 |
| 2,935,997 | 5/1960 | Abercrombie | 137/458 |
| 2,935,998 | 5/1960 | Richardson | 137/458 |
| 3,092,136 | 6/1963 | Willis | 137/458 |
| 3,258,027 | 6/1966 | Willis | 137/458 |
| 3,749,355 | 7/1973 | Paul | 251/124 |
| 3,779,508 | 12/1973 | Paul | 251/124 |
| 3,800,822 | 4/1974 | Baker | 137/489.5 |

*Primary Examiner*—Alan Cohan
*Assistant Examiner*—Gerald A. Michalsky
*Attorney, Agent, or Firm*—Vinson, Elkins, Searls, Connally & Smith

[57] ABSTRACT

A high-low shutoff valve of the reciprocating ball type which does not vent fluid to atmosphere upon the closing of the valve in response to operation of either the high or low pressure pilot.

4 Claims, 1 Drawing Figure

U.S. Patent
Nov. 16, 1976
3,991,784
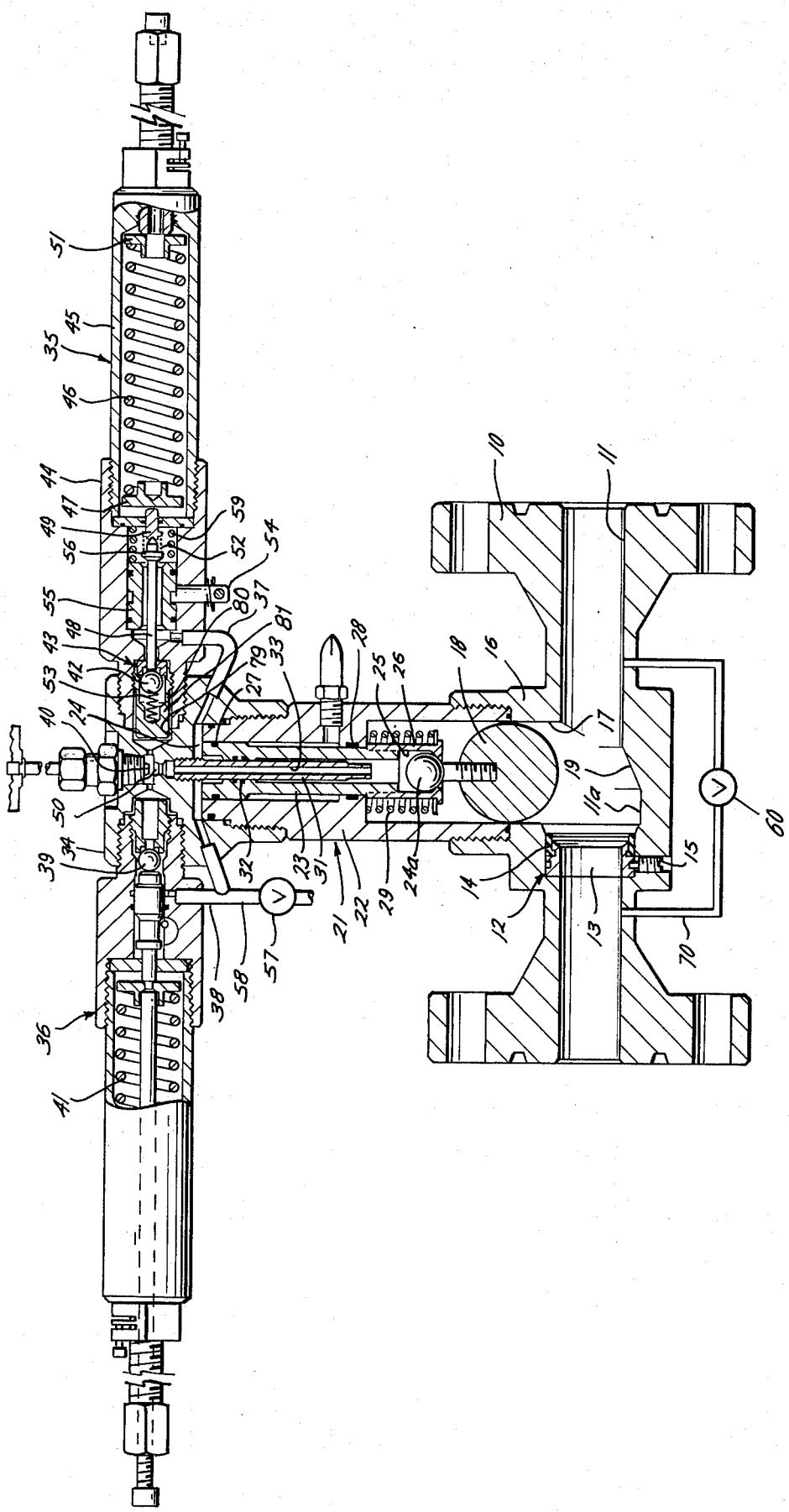

HIGH/LOW SAFETY VALVE

This invention relates to high-low shutoff valves and more particularly to a valve of the reciprocating ball type.

Shutoff valves operated automatically in response to tripping of a high and a low pressure pilot are well known. Reciprocating ball members in which the ball is held in a pocket until a pilot is tripped are also well known. In prior ball valves, the ball is released in response to operation of a pilot and drops into the flowway and thence is moved into engagement with the seat by differential pressure. Such a valve has the disadvantage that special apparatus must be provided to reintroduce the free ball into the pocket when the valve is returned to open position.

High-low valves of the type employing balls in the past have positioned the valve pocket immediately adjacent to the seat in the flowway and as the valve moved down into the flowway it did so in close proximity to the seat resulting in lateral movement across the seat which sometimes damaged the seat.

In low pressure pilots for use with shutoff valves the valve member usually moves towards the source of pressure in response to a reduction in pressure. In this type of valve no problem is encountered where operation of the low pressure pilot results in venting of a chamber to close the valve. In some types of shutoff valves it is desirable that pressure not be vented to atmosphere and that line pressure remain effective on the valve operator after the valve is closed. In low pressure pilot valves of the type shown in this application the valve would normally close once pressure has been equalized across the valve member unless special provisions are made to maintain the low pressure pilot in open position.

It is an object of this invention to provide a ball valve and actuator having a reciprocating ball valve member in which movement of the actuator to valve open and close position effects movement of the ball valve member to valve open and close position.

Another object is to provide a ball valve having a reciprocating ball which in closing moves into the flowway and then moves in a direction substantially axially of the flowway through the valve toward the seat.

Another object is to provide a low pressure pilot for a shutoff valve which does not vent to atmosphere in closing the valve and in which the pilot, once opened, will remain open.

Other objects, features and advantages of the invention will be apparent from the drawing, the specification, and the claims.

In the drawings wherein an illustrative embodiment is shown, the single FIGURE is a view in vertical cross-section through a valve constructed in accordance with this invention.

The valve body 10 has a flowway 11 extending therethrough. A valve seat assembly indicated generally at 12 is provided across said flowway. The seat assembly may take any desired form and in the illustrated form includes a metal seat 13 and a resilient seat 14 carried by the metal seat. The seat is held in place by a lock 15 having a nose portion projecting into a groove on the metal seat 13.

In accordance with this invention, the valve body 10 is generally T-shaped with the leg of the T 16 having a bore 17 therein providing a ball pocket which is located in the upstream side of the seat 12 for receiving the ball 18 when the valve is in open position. Preferably, the ball pocket is sized to completely contain the ball, that is out of flowway 11, when the valve is in open position.

It will be noted that the ball pocket 17 is spaced from the seat assembly a short distance. This is to allow the ball to move downwardly when moving to close position without engaging the seat until it is substantially in the flowway 11. It will be noted that the flowway at 11a is enlarged to receive the ball which is larger than the bore through seat assembly 12. As the ball moves downwardly towards seated position, fluid passing through the valve may flow pass the valve in this enlarged area; thus, permitting the ball to substantially enter the flowway without substantial movement towards the seat. Under high differential conditions, when the ball has moved down into the enlarged flowway section 11a, the differential across the ball will then move the ball into engagement with the seat to block flow through the valve.

To positively urge the ball into a position almost in engagement with the seat, an inclined surface 19 is provided in the flowway. This surface is arranged to provide an inclined plane forcing the ball towards the seat as it is moved downwardly. While this plane is not necessary for high differential conditions across the ball valve 18, it is preferred, so that under low differential conditions the ball will be mechanically moved almost into engagement with the seat and the low pressure differential can than complete seating of the ball valve 18.

With the construction as just explained, it will be appreciated that the ball will, as it moves into engagement with the seat, be moving in a direction substantially parallel to the axis of the flowway 11. This will prevent the ball from damaging the resilient seat 14 or galling the metal seat 13; which action might ocurr if the ball were not spaced from the seat when it begins its downward movement into the flowway.

A valve operator indicated generally at 21 is provided for reciprocating the ball 18 between open and closed position. Preferably, the operator is of the type in which fluid is contained and is not exhausted to atmosphere upon closing of the valve.

The valve actuator includes a body 22 suitably connected to the valve body 16. Reciprocally mounted within the body 22 is piston 23, which, as will be explained, move downwardly in response to pressure being applied in chamber 24 above the piston to close the valve.

The ball valve member 18 is secured to the piston 23 by an articulating means such as the ball 24a, which is carried by the ball seat member 18, and socket 25 within the lower extension 26 of the piston 23. With this arrangement, the ball seat member 18 is free to articulate after it moves down into the flowway 11 and move into engagement with seat 12. Any other suitable type of connection between the actuated piston 23 and the ball valve member 18 which will permit the ball 18 to move or articulate into engagement with the seat 12 maybe utilized.

The valve operator piston 23 reciprocates within chamber 24. It will be noted that seal 27 on the upper end of the piston is of a larger diameter than seal 28 which surrounds the lower section of the piston. Upstream pressure is effective over the area of seal 28 to hold the piston in the upper position. When upstream pressure is conducted to the top of chamber 24, this larger area will result in downward movement of the valve. Such movement is assisted by the spring 29 which is in compression when the valve is in the open position.

A stinger 31 extends down into piston 23 and suitable seals 32 on the piston separate pressure from above and below the piston. The stinger has a bore 33 extending therethrough which is exposed to upstream pressure and conducts upstream pressure into the pilot valve adapter 34. This pressure is exerted on the low pressure pilot indicated generally at 35 and the high pressure pilot indicated at 36. Upon opening of the pilots, pressure is conducted from the low pressure pilot via conduit 37 to chamber 24 and from the high pressure pilot via conduit 38 to chamber 24 to force piston 23 down and seat ball valve member 18 as hereinabove explained.

The high pressure pilot 36 is a standard type D pilot valve available from Otis Engineering Corporation of Dallas, Texas and illustrated on page 4033 of the *Composite Catalog of Oil Field Equipment and Services*, 31st Revision. As the high pressure pilot is conventional in form, it suffices to say that upstream pressure is effective on ball 39 and when the force of this pressure is greater than the force exerted by spring 41, the ball 39 moves from its seat and permits fluid to flow through conduit 38 to the chamber 24 and close the valve.

The low pressure pilot 35 is a modified form of the Otis type B pilot, also shown on page 4033 of the *composite Catalog of Oil Field Equipment and Services*, 31st Revision. While the basic configuration of the type B pilot is followed, it is modified so that the ball 42, once cracked from its seat assembly, indicated generally at 43, will remain in the open position. It is desirable that the low pressure pilot once in service should remain in service so that the upstream pressure will be effective on the valve operator until steps are taken to return the pressure conditions to proper level and reset the valve.

The pilot 35 includes a body 44, which is secured to the adapter 34 as by threads as shown. A spring housing 45 extends from the body 44 and a spring 46 is positioned therein and exerts a force on end piece 47. This force is in turn exerted on the two piece push rod provided by long and short push rods 48 and 49, respectively. The push rod 48 is in contact with the ball 42, as shown, when the pilot is closed. When pressure falls below a certain amount, the force of spring 46, as determined by the adjustment of end piece 51, results in movement of the two piece push rod to ball unseat position. This permits flow of upstream pressure from the interior of adaptor 34 through bore 79 in body 44 and thence through port 80 in spring housing 81 past the ball and through line 37 to chamber 24 to close the valve.

To prevent the ball 42 returning to its seat in the event upstream pressure increases to a value above the setting of the pilot 35, the push rod 48 is maintained in ball unseating position. This function is accomplished by providing a spring 52 between the two push rod sections 48 and 49 which exerts the same force as spring 53, which urges the ball 42 towards its seat. It will be noted from the drawing that when the pilot is closed the force exerted on the ball by upstream pressure not only holds the ball on its seat, but exerts a force on push rod 48 which maintains the spring 52 between the two push rods in collapsed position with the two push rods in engagement with each other. Once the ball is unseated, this force is removed and the spring 52 is permitted to expand so that the push rod 48 and ball 42 float between the two springs with the ball 42 off of its seat.

When it is desired to recock the pilot 35, the shutoff valve 40 is moved into engagement with seat 50 to isolate upstream pressure from the low pressure pilot. The valve 60 within line 70 is opened to equalize pressure across the ball 18. At this time valve 57 is opened in vent line 58 to drain pressure fluid from the chamber 24. This fluid may be drained into any suitable container or into the atmosphere. As the pressure is removed from chamber 24, upstream pressure will be effective on piston 23 to raise the piston and withdraw the ball valve 18 into its pocket 17 to open the flowway through the valve. At this time the bypass control valve 60 may be closed. The eccentric pawl 54 is then rotated to move sleeve 55 into engagement with flange 56 on push rod 48 and to move the rod 48 away from the ball a sufficient distance for the ball to be returned to its seat 43. The shutoff valve 40 can then be opened and pressure permitted to be exerted upon the seated valve 42. The eccentric pawl can then be released and spring 59 will return the reset sleeve 55 to the position shown. This will release the push rod 48 and the low pressure pilot will be in service condition again. It will be apparent that the low pressure pilot could be reset without closing the shutoff valve 40, but it is preferred to first close the valve so that it may be reset under no-pressure conditions.

In operation the valve 60 will be closed and the shutoff valve 40 will be opened. If the pressure within the flowway 11 falls below or rises above the set range the appropriate pilot valve will open to pressurized chamber 24 and move the valve actuator to closed position.

As piston 23 moves downwardly, the valve 18 will move out of its pocket 17 and into the flowway 11. The inclined surface 19 will direct the ball 18 in a direction generally parallel to the axis of the flowway toward the seat where the pressure differential across the ball will effect seating of the ball and thus closing of the valve. This is accomplished by upstream pressure passing through the passway 33 and thence through either of the pilot valves to chamber 24.

If the pressure conditions rise above the upper limit of the set range, pressure on ball 39 of the high pressure pilot 36 will unseat the ball permitting the high pressure fluid to flow into chamber 24 to be effective on the larger end of piston 23 to move the piston downwardly and seat the ball.

If the pressure fluid falls below the said range, then the reduction in pressure on ball 42 permits the action of spring 46 to unseat ball 42 and permit pressure fluid to flow through line 37 into chamber 24 to move the valve to seated position. After valve 42 is off of its seat, the spring 52 which has been held in compression by the pressure differential across the ball 42, is effective to move the push rod 48 toward a position which will maintain the ball off of its seat until manual recocking of the low pressure pilot, as the two srings 52 and 53 exert substantially equal force.

The foregoing disclosure and description of the invention are illustrative and explanatory thereof and various changes in the size, shape and materials, as well as in the details of the illustrated construction, may be made within the scope of the appended claims without department from the spirit of the invention.

What is claimed is:
1. A ball valve comprising;
a T-shaped body having a flowway therethrough, a valve seat across said flowway,
a ball valve member cooperable with said seat for controlling flow therethrough,
a ball pocket in the leg of said T-shaped body on the upstream side of said seat for receiving said ball valve member when the valve is in open position,
a valve operator including a low pressure pilot,
articulating means connecting the valve operator and ball valve member and providing for opening and closing of the valve in response to operation of the valve operator,
and an inclined surface formed on the body and in the flowway in the path of travel of the ball valve member as it moves toward closed position to direct the ball valve member toward the seat,
said low pressure pilot comprising;
a pressure tight housing,
a flowway through the housing,
a seat across said flowway,
a ball cooperative with said seat to control flow through said flowway,
a two piece push rod engaging said ball,
resilient means urging said push rod toward ball unseating position,
and a pair of springs exerting approximately equal force,
one spring urging the ball toward seated position and the other urging the two sections of the push rod away from each other.

2. A low pressure pilot comprising;
a pressure tight housing,
a flowway through the housing,
a seat across said flowway,
a ball cooperative with said seat to control flow through said flowway,
a two piece push rod engaging said ball,
resilient means urging said push rod toward ball unseating position,
and a pair of springs exerting approximately equal force,
one spring urging the ball toward seated position and the other urging the two sections of the push rod away from each other.

3. A ball valve comprising;
a body having a flowway therethrough,
a valve seat across said flowway,
a ball valve member cooperable with said seat for controlling flow therethrough,
a ball pocket in said body on the upstream side of the seat for receiving said ball valve member when the valve is in open position,
a valve operator,
an inclined surface in the flowway in the path of travel of the ball valve member as it moves toward closed position to direct the ball valve member toward the seat,
said valve operator including,
a pressure responsive member connected to said articulating means,
a high pressure pilot,
a low pressure pilot,
means conducting pressure fluid from said valve body upstream of said seat to both said high and low pressure pilots,
means conducting fluid from said high and low pressure pilots to pressure responsive means to close said ball valve member in the event of opening of either of said high or low pressure pilots.

4. The valve of claim 3 wherein the low pressure pilot includes;
a pressure tight housing,
a flowway through the housing,
a seat across said flowway,
a ball cooperative with said seat to control flow through said flowway,
a two piece push rod engaging said ball,
resilient means urging said push rod toward ball unseating position,
and a pair of springs exerting approximately equal force,
one spring urging the ball toward seated position and the other urging the two sections of the push rod away from each other.

* * * * *